United States Patent [19]

Okada et al.

[11] Patent Number: 5,315,401

[45] Date of Patent: May 24, 1994

[54] APPARATUS FOR RECORDING AND/OR REPRODUCING DIGITAL VIDEO AND AUDIO SIGNALS OPERABLE IN AN AFTER-RECORDING MODE

[75] Inventors: Hiroshi Okada, Tokyo; Keiji Kanota; Yukio Kubota, both of Kanagawa, all of Japan

[73] Assignee: Sony Corporation, Tokyo, Japan

[21] Appl. No.: 941,244

[22] Filed: Sep. 4, 1992

[30] Foreign Application Priority Data

Sep. 12, 1991 [JP] Japan .................... 3-233332

[51] Int. Cl.[5] .............................................. H04N 5/95
[52] U.S. Cl. ......................................... 358/337; 358/341; 358/343
[58] Field of Search ............... 358/337, 341, 343, 320, 358/149; 360/19.1, 36.1

[56] References Cited

U.S. PATENT DOCUMENTS

| | | | |
|---|---|---|---|
| 4,313,135 | 1/1982 | Cooper | 358/149 |
| 4,445,187 | 4/1984 | Best | 364/521 |
| 4,703,355 | 10/1987 | Cooper | 358/149 |
| 4,766,505 | 8/1988 | Nakano et al. | 360/19.1 |
| 5,130,812 | 7/1992 | Yamaoka | 358/335 |

Primary Examiner—Tommy P. Chin
Assistant Examiner—Robert Chevalier
Attorney, Agent, or Firm—William S. Frommer; Alvin Sinderbrand

[57] ABSTRACT

A digital video tape recorder for recording and reproducing digital video and digital audio signals in separate portions of at least one common record track is operable in an after-recording mode, for example, to record in different tracks a digital audio signal that is associated with a previously recorded digital video signal. Digital video and audio processors exhibit inherent time delays $t_2$ and $t_{21}$ when processing reproduced digital video and audio signals ($t_{21} < t_2$); and, during a normal reproducing mode the digital audio signal is delayed by an amount substantially equal to $t_2 - t_{21}$ so that the reproduced digital video and audio signals are recovered in synchronism. This delay is reduced to a minimal amount when the apparatus operates in its after-recording mode. Conversely, if the digital video signal is recorded in the after-recording mode, the audio signal delay is increased such that the originally recorded digital audio signal and the after-recorded digital video signal are recovered in synchronism.

22 Claims, 6 Drawing Sheets

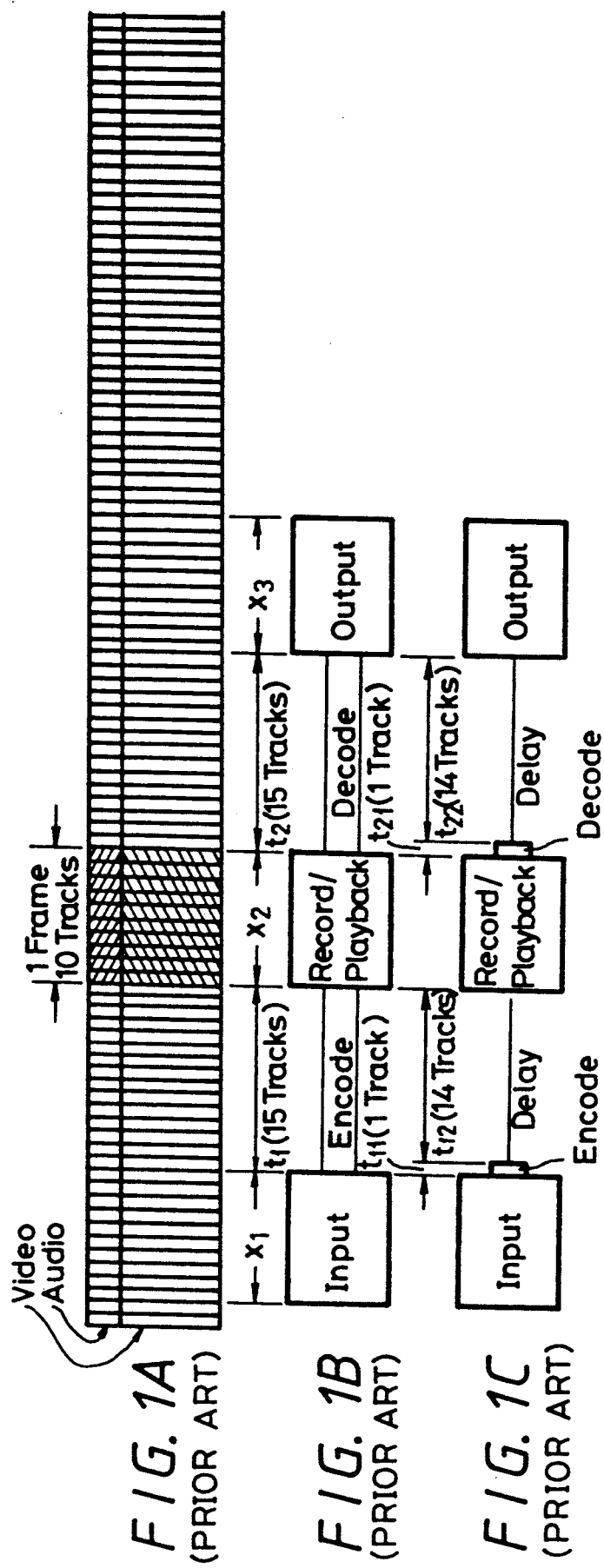

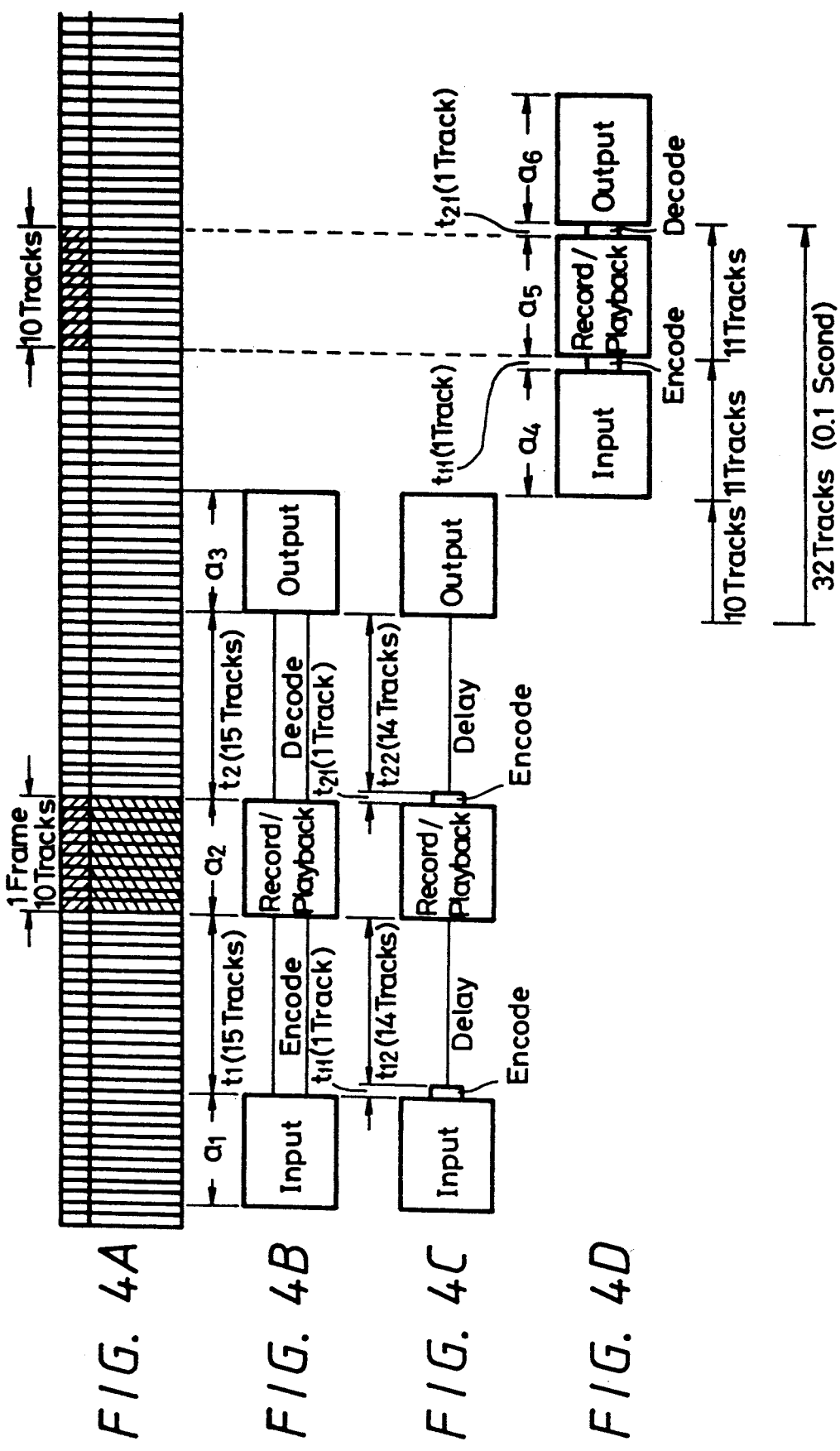

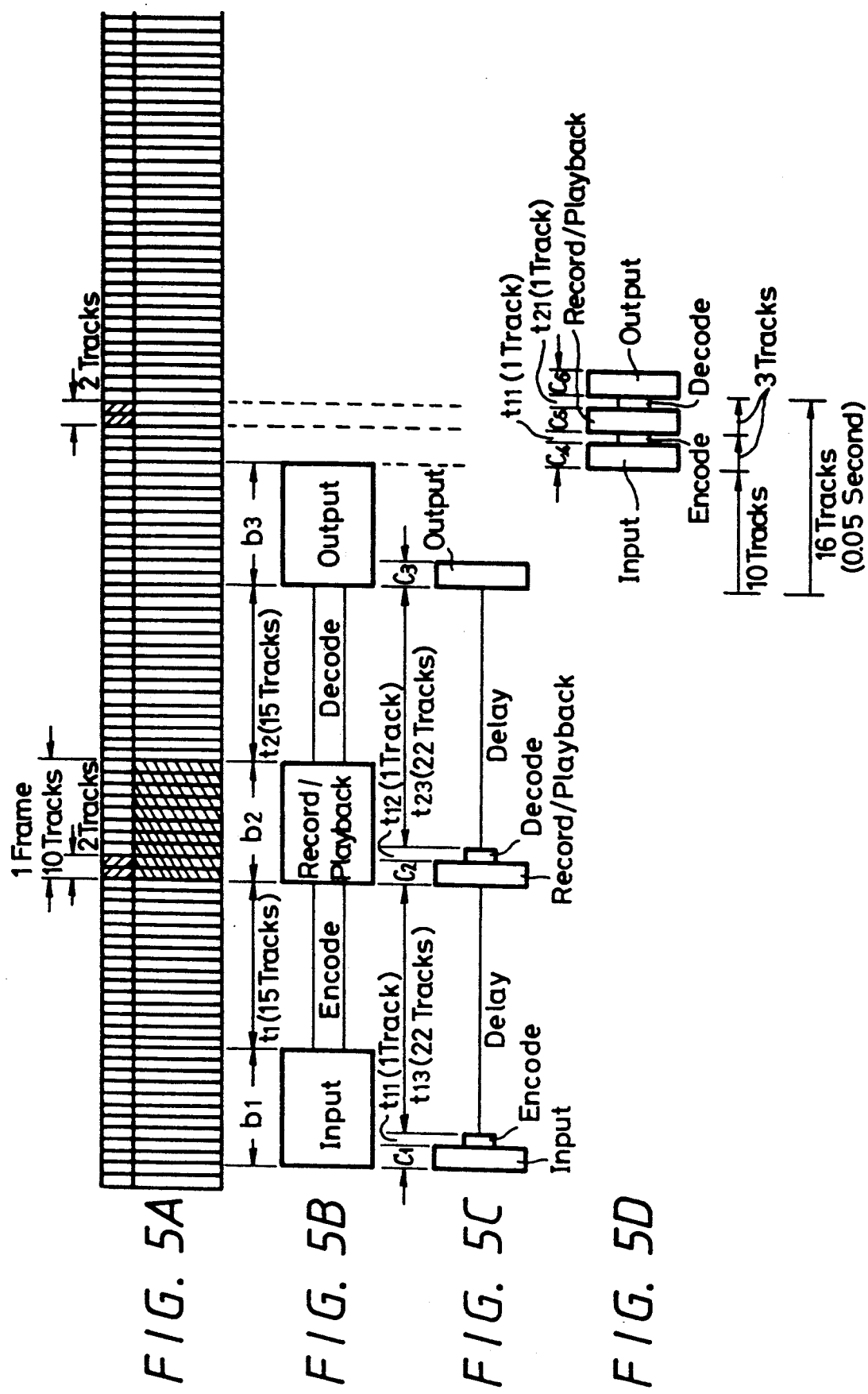

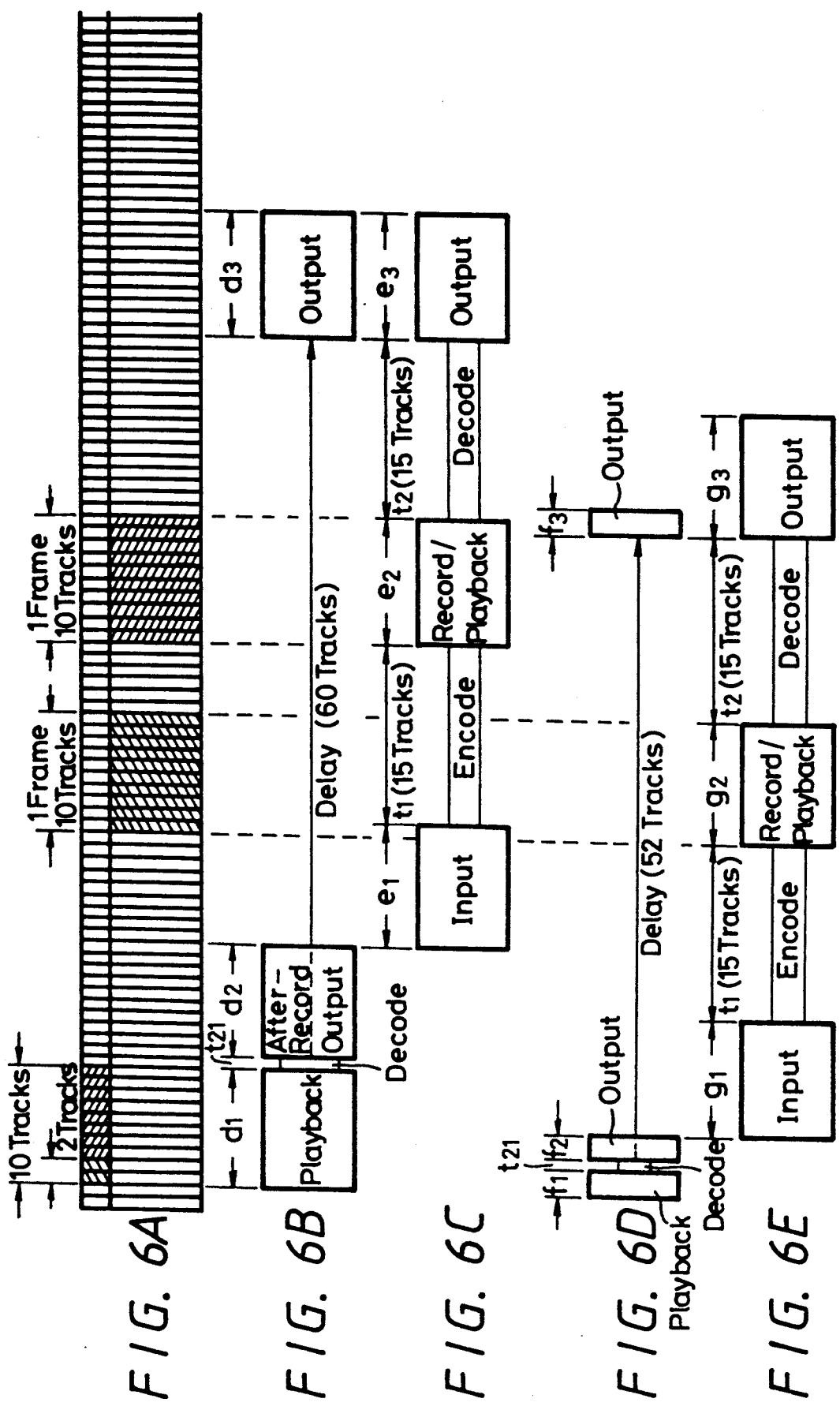

APPARATUS FOR RECORDING AND/OR REPRODUCING DIGITAL VIDEO AND AUDIO SIGNALS OPERABLE IN AN AFTER-RECORDING MODE

BACKGROUND OF THE INVENTION

This invention relates to digital video recording apparatus, such as a digital video tape recorder and more particularly, to a digital VTR intended for consumer use and operable in an after-recording mode to record a digital audio signal at a later time after a digital video signal has been recorded or alternatively, to record a digital video signal at a later time after the digital audio signal has been recorded.

In digital VTRs developed for consumer use, it is typical to record video and audio signals in digital form in different areas of the same track. For example, when recording sound and movement of a human subject, a video frame interval is recorded in a number of tracks and the sound uttered by the subject (referred to generally as the audio signal that is associated with the video signal) is recorded in those very same tracks, but at different locations. When recording in the NTSC standard, a frame interval of digitized video signals is recorded in ten tracks and the digitized audio signals associated therewith are recorded in the very same tracks. Of course, when the digitized audio signals represent sounds uttered by the subject, the recording of digitized video and audio signals in common tracks results in a video picture having proper lip synchronization, or movement between the subject's lips and the sounds emitted therefrom.

The recording of video and audio signals in separate portions of common tracks facilitates dubbing, voice overlay and other so-called special effect techniques. Hence, digital audio signals may be recorded at a later time, yet be associated with the previously recorded digital video signals. Conversely, video signals may be dubbed by editing digital video information onto a record medium which contains previously recorded audio information. The subsequent recording of digital audio signals that are intended to be associated with previously recorded digital video signals and the subsequent recording of digital video signals that are intended to be associated with previously recorded digital audio signals is referred to as after-recording and is a general description of re-recording audio or video signals after the basic recording of video and audio information is completed.

In a typical after-recording operation, the after-recorded digital audio (or video) signals are recorded in different tracks than the previously recorded digital video (or audio) signals associated therewith. These different tracks typically are located downstream (or delayed) from the originally recorded signals. When these signals are reproduced, a time difference is introduced between the reproduced digital video and audio signals which is manifested as a loss of synchronism therebetween. This is particularly noticeable and undesirable when the after-recorded signals are, for example, dubbed digital audio signals. In that event, when the reproduced digital video and audio signals are displayed as a video picture, there is a loss of synchronism between the movement of the subject's lips and the sound emitted therefrom. Stated otherwise, the operation of a digital VTR in its after-recording mode generally is associated with a loss of "lip sync."

The foregoing can best be appreciated by referring to FIGS. 1A-1C and 2A-2C of the accompanying drawings. FIG. 1A is a schematic representation of record tracks on a digital video tape in which digital video and digital audio signals are recorded. For the purpose of discussion, the basic information unit illustrated in FIG. 1A is a video frame interval; and the digital video signals included in this interval are recorded in ten tracks when using the NTSC format, and in twelve tracks when using the PAL format. The digital video signals are recorded in a major portion of each of these ten tracks; and the digital audio signal associated with that digital video signal, such as the audio signal that may be picked up simultaneously with the imaging of the video signal, also is recorded in these same ten tracks but, as shown in FIG. IA, in a smaller upper portion of each track. Thus, a unit of digital video signals is recorded in a ten-track segment and an associated unit of digital audio signals also is recorded in this ten-track segment.

FIG. 1B illustrates a timed relationship between the encoding, recording, reproducing and decoding of a digital video signal relative to the movement of the tape shown in FIG. 1A. A frame of digital video signals is supplied for recording during a period $x_1$ and is encoded (for example, it is "shuffled") for recording in the ten-track segment during time interval $x_2$. The encoding of the digital video signal is effected by digital processing circuitry in a matter known to those of ordinary skill in the art, and this processing circuitry exhibits an inherent time delay $t_1$. This time delay $t_1$ is seen to be equivalent the movement of 15 tracks of the video tape. Hence, this time delay $t_1$ is referred to as a 15 track delay. From FIGS. 1A and 1B, is seen that a given point in a frame interval of a digital video signal is recorded in a track that is delayed by 25 tracks from the time that such point in the video signal is first supplied.

When the digital video signal is reproduced at a later time, it is played back during time interval $x_2$ and then decoded (or "deshuffled") by digital processing circuitry normally used for this purpose. This decoding operation exhibits an inherent time delay $t_2$ which, typically, may be approximately equal to the inherent time delay $t_1$ exhibited by the encoder. Thereafter, the decoded digital video signal is recovered as an output video signal during time interval $x_3$. It is seen from FIG. 1B that a time delay on the order of 25 tracks is present between the reproduction and the recovery of a given time point of a frame interval.

FIG. 1C illustrates the timing relationship in recording and reproducing an associated digital audio signal. A unit of audio signals (assumed to correspond to a frame interval) is supplied for recording during the interval $x_1$, and this audio signal is encoded, such as for error correction, by digital audio processing circuitry of a type known to those of ordinary skill in the art. Such digital audio processing circuitry exhibits an inherent time delay $t_{11}$ wherein $t_{11} < t_1$. As a numerical example, this inherent delay $t_{11}$ is equal to a one track delay.

So that the digital audio signal may be recorded in the same tracks (but at separate portions) as the digital video signal associated therewith, the encoded audio signal is delayed by an amount $t_{12}$ (ideally, $t_{12} = t_1 - t_{11}$) thereby bringing the digital audio signal into time synchronism with the encoded digital video signal. The digital audio signal then is recorded during time interval $x_2$ in the same tracks as the digital video signal. Hence, the associated digital and audio signals are supplied to the recording heads in synchronism.

During a playback operation, the unit of digital audio signals is reproduced during the time interval $x_2$, as shown in FIG. 1C, and then decoded (or error-corrected). This decoding operation exhibits an inherent time delay $t_{21}$ ($t_{21} < t_2$); and to assure that the recovered digital audio signals are in synchronism with the associated digital video signals, the decoded audio signals are delayed by a time delay $t_{22}$ (ideally, $t_{22} = t_2 - t_{21}$. Thus, by delaying the reproduced, decoded digital audio signals, a given time point in the unit of recovered audio signals is in proper synchronism with a corresponding time point in the recovered video signals. Consequently, during normal recording and reproduction, the video and audio signals are in proper synchronism and correct "lip sync" is present in the video picture recovered therefrom. That is, there is essentially no time difference between the reproduced digital and audio signals.

FIGS. 2A-2C illustrate how proper synchronism between previously recorded video signals and after-recorded audio signals is lost because of a substantial time difference that is present when the digital video and after-recorded digital audio signals are reproduced. FIG. 2A is a schematic representation of record tracks in which a frame of previously recorded digital video signals is reproduced from a 10-track segment during a playback period $x_2$. In the after-recording mode, although digital audio signals also may be reproduced from this same 10-track segment, such digital audio signals are ignored and, thus, in the interest of simplification, a unit of digital audio signals is not illustrated as being recorded in this 10-track segment.

As occurred during a normal record/playback operation, the reproduced digital video signals are decoded by the aforementioned digital processing circuitry which, as discussed above, exhibits an inherent time delay $t_2$. The decoded video signal then is recovered as the output video signal during time interval $x_3$. The playback operation schematically represented in FIG. 2B is seen to be substantially identical to the playback operation schematically illustrated in FIG. 1B. Thus, a delay of about 25 tracks is present between the reproduction and the recovery (or output) of a given time point of a frame interval of the digital video signal.

Now, in an after-recording operation, a unit of the audio signal that is associated with this reproduced video signal is supplied for recording substantially immediately after the video signal is recovered. This timing relationship is schematically illustrated in FIG. 2C, wherein the audio signal is supplied during the interval $x_4$ which is delayed by only 10 tracks (i.e. one frame interval) from the beginning of the frame interval of the recovered digital video signal with which this audio signal is associated. As before, this audio signal is encoded by digital audio processing circuitry exhibiting the inherent time delay $t_{11}$, for example, a 1-track delay, and the encoded digital audio signal then is delayed by the amount $t_{12}$ before it is recorded.

It is seen that, when an audio signal is supplied for recording in the after-recording mode, the inherent delay of the digital audio processing circuitry coupled with the additional delay normally imparted to the digital audio signal during a recording operation results in a time delay on the order of about 60 tracks from the location of a given time point in the digital video signal and the location of a corresponding time point in the after-recorded digital audio signal.

During a subsequent playback operation, the digital video signal is reproduced during time interval $x_2$ and, 60 tracks later, the associated, after-recorded digital audio signal is reproduced during a time interval $x_5$. As before, the digital video signal is decoded by digital processing circuity exhibiting the inherent time delay $t_2$ and then is recovered as an output video signal during the time interval $x_3$. The reproduced digital audio signal, on the other hand, is decoded by digital audio processing circuitry exhibiting the inherent time delay $t_{21}$, and the decoded audio signal then is delayed by the time delay $t_{22}$ such that the audio signal is recovered during the time interval $x_6$. A comparison of FIGS. 2B and 2C indicates that, when the audio signal is recorded in the after-recording mode, the fact that the audio signal is recorded in tracks delayed from those in which the video signal is recorded, coupled with the additional time delay normally added to the reproduced audio signal for the purpose of assuring synchronism between the recovered video and audio signals results in a substantial time difference between the recovered digital video signal and the associated digital audio signal. This time difference is about 60 tracks, or 6 frames, which is approximately 0.2 seconds. Consequently, when a video picture is displayed from after-recorded signals, the video and audio signals are not in proper synchronism and "lip sync" is noticeably lost.

OBJECTS OF THE INVENTION

Therefore, it is an object of the present invention to provide improved digital video tape recording apparatus operable in an after-recording mode which provides satisfactory synchronism between reproduced video and audio signals, resulting in acceptable lip sync.

Another object of this invention is to provide digital video tape recording apparatus in which audio signals are selectively delayed during recording and/or reproduction so as to minimize a time difference between recovered video and audio signals which are separately processed by circuitry exhibiting different inherent delays.

A further object of this invention is to provide apparatus of the aforementioned type in which audio signals or video signals may be recorded in an after-recording mode, yet when the after-recorded signals are reproduced, time differences between the recovered video and audio signals are minimized.

An additional object of this invention is to provide apparatus of the aforementioned type wherein audio or video signals may be recorded in an after-recording mode, yet when those signals are reproduced, a video picture displayed therefrom exhibits proper lip sync between the movement and sounds of a subject.

Various other objects, advantages and features of the present invention will become readily apparent from the ensuing detailed description, and the novel features will be particularly pointed out in the appended claims.

SUMMARY OF THE INVENTION

In accordance with this invention, digital video tape recording apparatus is provided for recording digital video and digital audio signals in separate portions of at least one common record track. The video signals are processed for recording and/or reproduction by processing circuitry exhibiting an inherent time delay $t_1$. Similarly, the audio signals are processed for recording and/or reproduction by audio processing circuitry exhibiting an inherent time delay $t_{11}$, where $t_1 \neq t_{11}$. The digital audio signal that is recorded and/or reproduced normally is delayed by an amount so that, during a normal reproducing mode, the digital video and audio signals are recovered in synchronism. The apparatus is operable in an after-recording mode to record digital audio signals or digital video signals after the normal recording operation has been completed. The aforementioned audio signal delay is adjusted in the after-recording mode so that a time difference that otherwise would be present between reproduced video and audio signals is minimized.

As one aspect of this invention, if digital audio signals are recorded in the after-recording mode, the time delay normally imparted to the audio signals is reduced to, for example, zero, thereby reducing any time difference between the recovered video signal and the recovered, after-recorded audio signal.

As another aspect, if the video signals are recorded in the after-recording mode, the video signals are recorded downstream of the previously recorded audio signals, and the delay normally imparted to the audio signals during a playback operation is increased such that the audio signals and after-recorded video signals are recovered in substantial time synchronism.

BRIEF DESCRIPTION OF THE DRAWINGS

The following detailed description, given by way of example and not intended to limit the present invention solely to the embodiments described herein, will best be understood in conjunction with the accompanying drawings in which:

FIGS. 1A-1C are schematic representations of the timing relationship between video and audio signals that are recorded/reproduced in a normal mode;

FIGS. 4A-4D are schematic representations of the timing relationship between the recording and reproduction of video and audio signals in both normal and after-recording modes, in accordance with one embodiment of the present invention;

FIGS. 5A-5D are schematic representations of the timing relationship between video and audio signals that are recorded and reproduced in both normal and after-recording modes, in accordance with another embodiment of the present invention; and FIGS. 6A-6E are schematic representations of the timing relationship between video and audio signals that are recorded and reproduced when the video signals are recorded in the after-recording mode, in accordance with two embodiments of the present invention.

DETAILED DESCRIPTION OF PREFERRED EMBODIMENTS

Figures 2A, 2B, 2C:
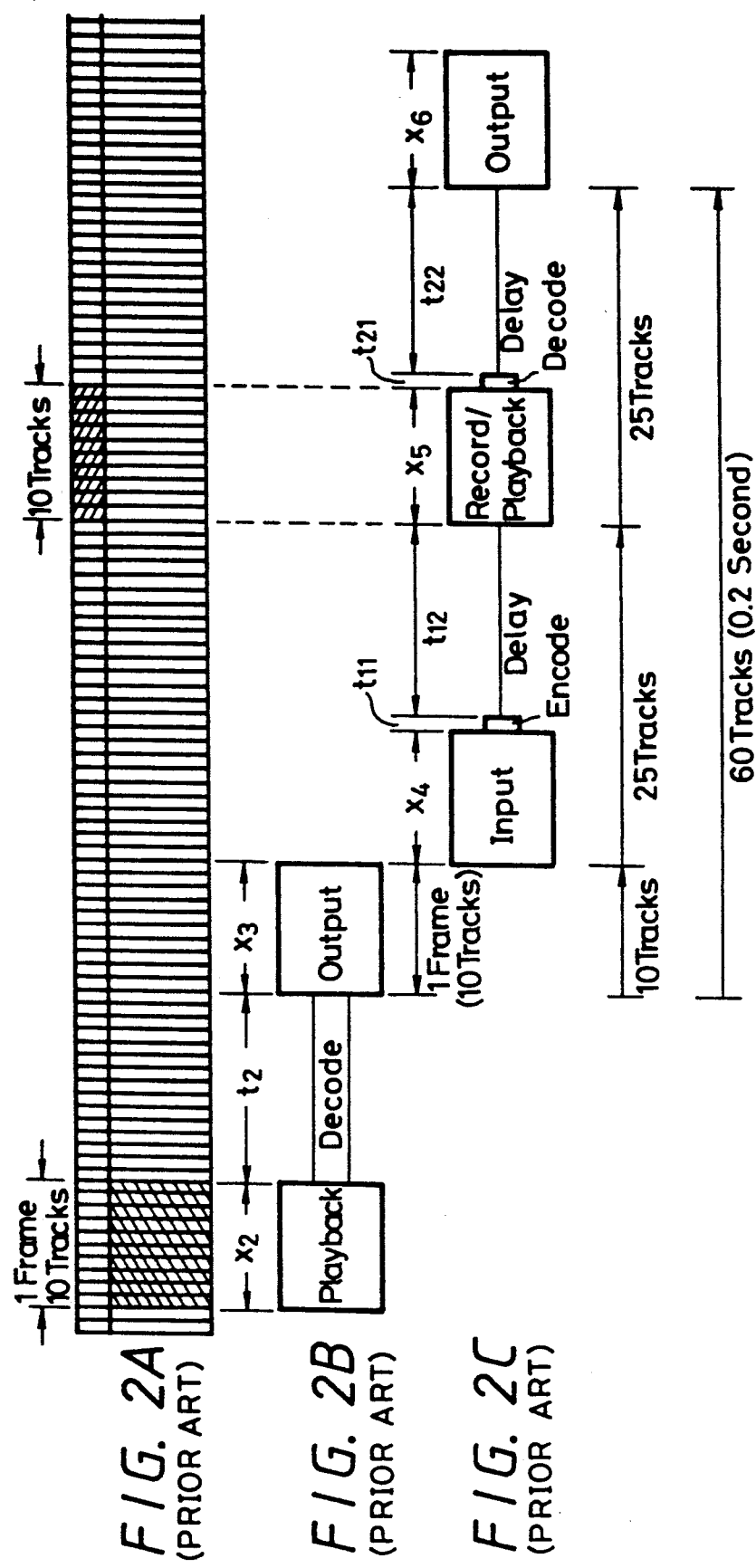
FIGS. 2A-2C are schematic representations of the timing relationship between the reproduction of video signals and after-recorded audio signals.
Figure 3:
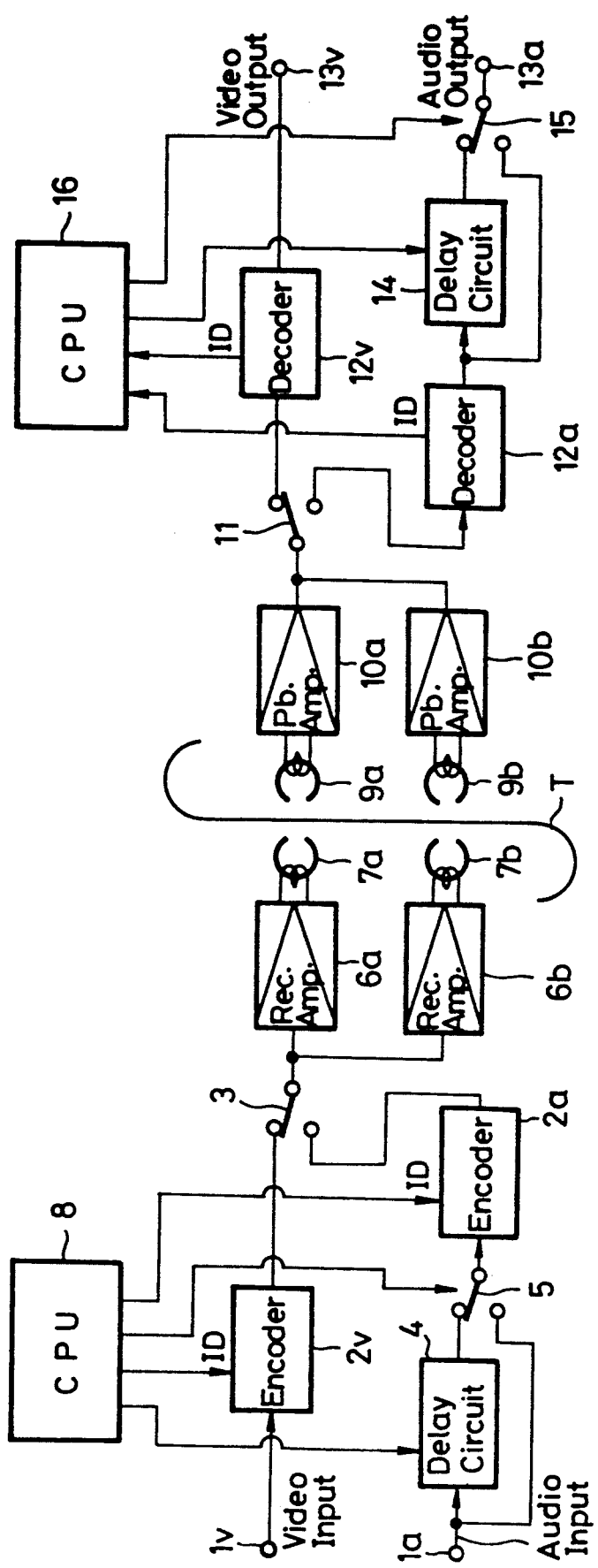
FIG. 3 is a block diagram of digital video tape recording apparatus which incorporates the present invention.

Referring to FIG. 3, a block diagram of a preferred embodiment of the present invention is illustrated, comprising a recording section having video and audio input terminals 1v and 1a, respectively, and signal processing circuitry for recording digital video and audio signals on a record tape T; and a reproducing section including signal processing circuitry for reproducing the previously recorded digital video and audio signals and supplying same to video and audio output terminals 13v and 13a, respectively. The digital video processing circuitry of the recording section includes an encoder 2v coupled to recording amplifiers 6a and 6b which, in turn, supply encoded digital video signals to recording heads 7a and 7b for recording in successive tracks on tape T (or other record medium). The recording section also is comprised of digital audio processing circuitry including an encoder 2a which is coupled to recording amplifiers 6a and 6b. As is typical, heads 7a and 7b are mounted 180° apart on a rotary drum such that heads 7a and 7b scan alternate record tracks across tape T to record the digital video and audio signals in successive, adjacent tracks. A selector switch 3 couples the digital video and audio signals alternately to heads 7a and 7b such that when a head is in position for recording, signals are supplied thereto.

Encoder 2v exhibits an inherent time delay $t_1$, whereby the digital video signals that are supplied thereto from input terminal 1v are processed with this inherent delay $t_1$. Encoder 2v is conventional and is adapted to effect, inter alia, a shuffling of successive line intervals, as is known to those of ordinary skill in the digital video recording art.

Encoder 2a exhibits an inherent time delay $t_{11}$ ($t_{11} < t_1$) and is adapted to effect, inter alia, an error correction coding operation. In view of the different time delays exhibited by encoders 2v and 2a, it is conventional to delay the digital audio signal supplied to encoder 2a from input terminal 1a by a time delay $\Delta$, wherein $\Delta$ is approximately equal to $t_1 - t_{11}$. However, in accordance with one embodiment of this invention, delay circuit 4 is bypassed when digital audio signals are recorded in an after-recording mode; and in this regard, a selector switch 5 is selectively operable to couple to encoder 2a either the digital audio signals delayed by delay circuit 4 or digital audio signals that are not subjected to such a time delay. Thus, selector switch 5 may be thought of as being operable to selectively bypass delay circuit 4.

A controller 8, such as a central processing unit (CPU), is coupled to selector switch 5 and is adapted to control the operation of this selector switch when the recording section operates either in its normal or after-recording mode of operation. More particularly, during a normal recording operation, selector switch 5 couples delay circuit 4 to encoder 2a. However, in an after-recording operation, selector switch 5 bypasses delay circuit 4 and couples the input digital audio signals directly to encoder 2a without being subjected to a time delay.

CPU 8 also is coupled to encoder 2a to supply to the encoder an after-recording identifying signal, referred to herein simply as an ID signal, thus indicating that the digital audio signal is being recorded in an after-recording mode. As will be described below, this ID signal is detected when the digital audio signal is reproduced and is used to select different delays in the reproducing section, depending upon whether the audio signal has been recorded in an after-recording mode. The selection of such delays is intended to minimize time differences that otherwise might be present in the recovery of digital video and audio signals that were subjected to after-recording and which otherwise would result in a loss of lip sync.

The embodiment shown in FIG. 3 is operable to record either digital audio or digital video signals in the after-recording mode. In this regard, CPU 8 also is coupled to encoder 2v to supply an ID signal thereto when digital video signals are after-recorded. It will be appreciated that the ID signal supplied either to the digital audio or digital video signal encoders 2a and 2v is recorded by heads 7a and 7b. The ID signals simply may be time division multiplexed with the encoded digital audio or digital video signal.

In one embodiment of the present invention, selector switch 5 is used to selectively bypass delay circuit 4 when, for example, digital audio signals are recorded in the after-recording mode, as will be described. In another embodiment, delay circuit 4 is an adjustable delay circuit and CPU 8 is coupled thereto to supply a delay control signal for selectively adjusting the delay exhibited thereby. As will be described below, the delay exhibited by adjustable delay circuit 4 is reduced, preferably to zero, when digital audio signals are recorded in the after-recording mode.

It will be appreciated that, in both normal and after-recording, selector switch 3 couples the digital video signal to, for example, recording amplifier 6a for recording on the major portion of a record track by head 7a; and when the head reaches the end portion of a track, switch 3 changes over to couple encoder 2a to recording amplifier 6a, whereupon the digital audio signal is recorded in this end portion of the track. This operation of selector switch 3 is conventional and results in the track format schematically illustrated in, for example, FIG. 1A Of course, when head 7b moves into position to scan a record track across tape T, the aforedescribed operation of switch 3 is used to supply video and then audio signals to head 7b to effect the recording of the track pattern shown in FIG. 1A.

The reproducing section of the digital video tape recording apparatus shown in FIG. 3 is adapted to complement the recording section. Accordingly, the reproducing section is comprised of playback amplifiers 10a and 10b coupled to reproducing heads 9a and 9b for amplifying the digital video and audio signals reproduced from the successive record tracks by these reproducing heads. In one embodiment, the reproducing and recording heads may be constituted by the very same transducers.

A selector switch 11, which may be similar to aforedescribed selector switch 3, couples playback amplifiers 10a and 10b to video and audio processing circuitry, including video decoder 12v and audio decoder 12a. It will be appreciated that, when head 9a (or head 9b) scans that portion of a record track in which the digital video signal is recorded, switch 11 couples playback amplifier 10a (or 10b) to digital video decoder 12v. Likewise, when head 9a (or 9b) scans that portion of a track in which the digital audio signal is recorded, switch 11 couples playback amplifier 10a (or 10b) to digital audio decoder 12a. Decoder 12v is adapted, inter alia, to carry out a "deshuffling" operation; and a decoded digital video output signal is supplied to video output terminal 13v from decoder 12v.

Similarly, audio decoder 12a is adapted, inter alia, to carry out an error correcting operation. The resultant decoded digital audio signal is coupled from decoder 12a to output terminal 13a by way of a delay circuit 14. It will be recognized that decoder 12v exhibits an inherent time delay $t_2$ in decoding the digital video signal; and decoder 12a exhibits an time delay $t_{21}$ when decoding the digital audio signal. Since $t_{21} < t_2$, delay circuit 14 is adapted to "match" these delays by imparting a further delay to the decoded digital audio signal. This additional delay $\Delta$ is approximately equal to $t_2 - t_{21}$. Hence, when the digital video tape recording apparatus is not operated in the after-recording mode, the delay $\Delta$ imparted by delay circuit 14 minimizes any time difference between the digital video and digital audio signals supplied to output terminals 13v and 13a, notwithstanding the different time delays imparted thereto by decoders 12v and 12a, thus assuring that the video and audio signals are recovered in synchronism. Hence, lip sync is obtained.

As a feature of this invention, when the digital video tape recording apparatus operates in the after-recording mode for the after-recording of digital audio signals, the delay $\Delta$ imparted by delay circuit 14 is minimized. A selector switch 15, which is similar to switch 5, operates to bypass delay circuit 14 and couple the decoded digital audio signals from decoder 12a to audio output terminal 13a. Selector switch 15 is controlled by a controller 16, such as a central processing unit (CPU) similar to CPU 8. In one embodiment, the functions performed by CPU 8 and CPU 16 may be carried out by a single, common central processor. During a reproduction operation, when digital video and audio signals that had been recorded in a normal recording mode are reproduced, CPU 16 operates switch 15 to couple the decoded digital audio signals through delay circuit 14 to audio output terminal 13a. However, when the reproduced digital video and audio signals had been recorded in the after-recording mode, the CPU controls switch 15 to bypass delay circuit 14.

It is recalled that if the digital audio signal is recorded in the after-recording mode, an ID signal indicative thereof also is recorded. Decoder 12a is coupled to CPU 16 and is adapted to detect the ID signal and supply same to the CPU. In response to this ID signal, the CPU operates switch 15 to bypass delay circuit 14.

In another embodiment, delay circuit 14 of the reproducing section of the digital video tape recording apparatus may be an adjustable delay circuit; and CPU 16 is coupled thereto to supply a delay control signal for selectively adjusting the delay exhibited by this adjustable circuit. As will be described below, the delay exhibited by adjustable delay circuit 14, like the delay exhibited by adjustable delay circuit 4, is reduced, preferably to zero, when digital audio signals that had been recorded in the after-recording mode are reproduced.

As mentioned above, the embodiment of FIG. 3 is operable to record digital video signals in the after-recording mode. In this mode, the digital video signals are recorded in tracks delayed from those tracks in which their associated digital audio signals are recorded. Hence, during reproduction, the digital video signals are recovered at a time substantially delayed from the recovery of their associated digital audio signals, even when the digital audio signals are delayed by delay circuit 14. To eliminate, or at least minimize this time difference, it is preferred to construct delay circuit 14 as an adjustable delay device whose time delay is increased when reproducing after-recorded digital video signals. To effect this, decoder 12v is coupled to CPU 16 to supply to the CPU an indication that the ID signal which is recorded when digital video signals are after-recorded, has been detected. The CPU responds to the ID signal detected by decoder 12v to supply a delay control signal to delay circuit 14 to increase the delay exhibited thereby; and this delays the recovery of the digital audio signal such that output terminals 13v and 13a are supplied with digital video and audio signals in synchronism. Hence, even though the digital video signals are recorded in the after-recording mode, lip sync is obtained in the recovered video and audio signals.

As will be described, a unit, or frame, of digital video signals (in the NTSC format) is recorded in a 10-track segment and, in one embodiment, a unit of digital audio signals likewise is recorded in a 10-track segment. In another embodiment, conventional compression techniques are used to record the unit of digital audio signals in a smaller number of tracks, such as in a 2-track segment, a 4-track segment, or the like.

The manner in which digital video and audio signals are recorded and reproduced by the apparatus shown in FIG. 3 now will be described with reference to the schematic representations shown in FIGS. 4A–4D. FIGS. 4A–4C are seen to be quite similar to aforedescribed FIGS. 1A–1C; and it is seen that, during a normal record/playback operation, a frame of digital video signals is supplied for recording during a period $a_1$ and is encoded to be recorded in the 10-track segment during time interval $a_2$. FIG. 4B illustrates the inherent time delay $t_1$ exhibited by encoder $2v$, and this time delay $t_1$ is equivalent to a 15-track delay.

As illustrated in FIG. 4C, a unit of digital audio signals is supplied for recording during the interval $a_1$; and this audio signal is encoded by encoder $2a$ which exhibits the inherent time delay $t_{11}$. As before, $t_{11} < t_1$. It is preferred to record the digital audio signal in the same 10-track segment as the digital video signal; and this is achieved by supplying the digital audio signal to encoder $2a$ via delay circuit 4. This delay circuit imparts a time delay $t_{12}$ ($t_{12} = t_1 - t_{11}$) so as to circuit 4. This bring the digital audio signals into time synchronism with the digital video signals. If the inherent delay of encoder $2a$ is equivalent to a 1-track delay, the delay imparted by delay circuit 4 is on the order of a 14-track delay. Hence, both the digital video and digital audio signals are recorded during the time interval $a_2$ in different portions of a common 10-track segment.

During reproduction, the digital video and audio signals recorded in the 10-track segment are reproduced by head $9a$ (or $9b$) during time interval $a_2$. The reproduced digital video signals are supplied by switch 11 to decoder $12v$ whereat they are decoded. As shown in FIG. 4B, decoder $12v$ exhibits an inherent time delay $t_2$ which is assumed herein to be substantially equal to the time delay exhibited by encoder $2v$. Thus, following a 15-track track delay, the decoded digital video signals are recovered and supplied to video output terminal $13v$ during time interval $a_3$.

The digital audio signals which are reproduced during time interval $a_2$ are supplied by switch 11 to decoder $12a$ whereat they are decoded. Decoder $12a$ exhibits an inherent time delay $t_{21}$ which, for example, is substantially equal to the inherent time delay exhibited by encoder $2a$. From FIG. 4C, it is seen that if the decoded digital audio signals are not delayed further, synchronism between the recovered digital video and audio signals would be lost. Accordingly, the decoded digital audio signals are supplied to delay circuit 14 which imparts a delay $t_{22}$ ($t_{22} = t_2 - t_{21}$) so that the digital video and audio signals are recovered in synchronism. In the example discussed herein, time delay $t_{22}$ is equivalent to a 14-track delay. Thus, a given time point in the unit of reproduced digital audio signals is in proper synchronism with a corresponding time point in the reproduced digital video signals.

Now, let it be assumed that the apparatus illustrated in FIG. 3 operates in its after-recording mode for the after-recording of digital audio signals. A typical application of the after-recording mode is to effect "dubbing" of, for example, voice signals onto pre-recorded video signals. For example, if a video scene includes a human subject and a translation of voice signals uttered by that subject is to be dubbed, an after-recording operation is implemented. It is appreciated, then, that new audio signals which are to be dubbed, or after-recorded, are supplied substantially immediately after a frame of video signals with which those audio signals are associated is reproduced. This supplying of new digital audio signals to be after-recorded is represented in FIG. 4D wherein such audio signals are supplied during the period $a_4$. It is seen that this period $a_4$ during which the digital audio signals are supplied for after-recording commences substantially immediately after time interval $a_3$, which is the time interval during which the decoded video signals are recovered.

As is the case during a normal recording operation, the digital audio signals supplied during time interval $a_4$ are encoded by encoder $2a$ exhibiting the inherent time delay $t_{11}$. If the digital audio signals are supplied to the encoder by way of delay circuit 4, the time delay between the recording of the digital video signals and the recording of the after-recorded digital audio signals (which are associated with those video signals) would be increased by 14 tracks, i.e. increased by the delay imparted by the delay circuit. In the after-recording mode, it is desirable to minimize the delay between the recording of digital video signals and the after-recorded digital audio signals. Consequently, when operating in the after-recording mode, selector switch 5 is operated by CPU 8 to bypass delay circuit 4, thereby reducing the delay normally imparted to the digital audio signals to zero. Alternatively, if delay circuit 4 is formed as an adjustable delay device, the CPU reduces the adjustable delay to a minimum value, such as zero. Accordingly, the encoded digital audio signal is recorded during time interval $a_5$ as which is delayed substantially only by the inherent delay $t_{11}$ of encoder $2a$. That is, the encoded digital audio signal is recorded after a 1-track delay, which is seen to follow the recovery of the digital video signal with which this after-recorded audio signal is associated by 11 tracks. Hence, a given time period in the digital audio signal is delayed by 21 tracks from a corresponding time period in the recovered digital video signal. Stated otherwise, in the after-recording mode, the delay normally imparted to the digital audio signal relative to the recording of a digital video signal is minimized.

When the digital video signal and its associated, after-recorded digital audio signal are played back, the delay normally imparted to the reproduced digital audio signal is minimized. From FIGS. 4A, 4B and 4D, it is recognized that the after-recorded digital audio signal is recorded 36 tracks downstream of its associated digital video signal. When these signals are reproduced, the digital video signal is recovered during time interval $a_3$ and then, 21 tracks later, the associated, after-recorded digital audio signal is reproduced during time interval $a_5$. As in the case of normal recording/reproducing, the reproduced digital audio signal is decoded by decoder $12a$ which exhibits the inherent time delay $t_{21}$. Now, to minimize the time difference between a given point in the recovered digital video signal and the corresponding point in the recovered digital audio signal, the delay normally imparted to the decoded digital audio signal by delay circuit 14 is minimized. This is achieved by switch 15, under the control of CPU 16, which bypasses delay circuit 14 and couples the output of decoder 12a directly to audio output terminal 13a. Thus, after the 1-track delay in the decoded digital audio signal attributed to decoder 12a, the digital audio signal is recovered as an output audio signal during time interval $a_6$.

Alternatively, if delay circuit 14 is an adjustable delay device, this device is controlled by CPU 16 to minimize the delay imparted thereby.

Thus, whereas an after-recorded digital audio signal otherwise is recovered 60 tracks later than its associated digital video signal, resulting in a time difference of about 0.2 seconds between a given time point in the digital video signal and a corresponding time point in the digital audio signal, the present invention reduces this time difference to only 32 tracks which is approximately 0.1 seconds. This time difference, or delay, is not readily noticeable in a video picture displayed from the recovered video and audio signals, thus substantially maintaining lip sync between a human subject and the voice signals emitted therefrom.

When the digital audio signals are recorded in the after-recording mode, a suitable after-recording control signal (not shown) is supplied to CPU 8 which, in turn, generates and couples the aforementioned ID signal to encoder 2a. This ID signal is recorded along with the after-recorded digital audio signal. During a reproducing mode, decoder 12a detects this ID signal in the reproduced digital audio signal and supplies an indication thereof to CPU 16. The CPU responds to this detected ID signal either to control switch 15 to bypass delay circuit 14 or, alternatively, to reduce the delay imparted by the delay circuit to zero.

In the embodiment illustrated in FIGS. 4A-4D, it is assumed that the unit of encoded digital audio signals is equal to a frame interval and, thus, is recorded in a 10-track segment. It is known that encoder 2a may encode the digital audio signal in a compressed form to constitute a "unit" which is substantially smaller than a frame interval and, thus, may be recorded in a lesser number of tracks. For example, encoder 2a may encode the digital audio signal into a "unit" which may be satisfactorily recorded in only two tracks. Likewise, decoder 12a may decode and recover the digital audio signal from a 2-track segment. This encoding/decoding of digital audio signals in units that are smaller than a video frame interval is represented by the schematic representations of FIGS. 5A-5D.

FIG. 5A illustrates the recording of a frame interval of digital video signals in a 10-track segment and the recording of digital audio signals associated therewith in a 2-track segment. As before, a frame of digital video signals is supplied for recording during a period $b_1$; and this digital video signal is encoded by encoder 2v for recording in the 10-track segment during time interval $b_2$. Consistent with the examples described above, encoder 2v exhibits the inherent time delay $t_1$ which is equal to a 15-track delay. The encoded digital video signal then is recorded in a 10-track segment during time interval $b_2$.

While the digital video signal is supplied, encoded and recorded, the digital audio signal likewise is supplied for recording; but here the digital signal is supplied as a unit for recording in a 2-track segment. Hence, in this embodiment, the digital audio signal is supplied during time interval $c_1$; and, like the aforedescribed embodiment, this digital audio signal then is encoded by encoder 2a which exhibits the inherent time delay $t_{11}$. As before, this time delay $t_{11}$ is on the order of a 1-track delay. During a normal recording operation, the digital audio signal is recorded in at least some of the same tracks as the digital video signal; and this is achieved by delaying the encoded digital audio signal by a suitable time delay by delay circuit 4 Here, delay circuit 4 imparts a time delay $t_{13}$ to the encoded digital audio signal, wherein $t_{13}$ is approximately 22 tracks. Then, the delayed, encoded digital audio signal is recorded during time interval $c_2$. A comparison of FIGS. 5B and 5C indicates that the beginning of a frame of digital video signals is recorded in the same track as the beginning of the encoded digital audio signal associated therewith.

When the digital video and audio signals are reproduced during a normal mode, the digital video signal in the 10-track segment is played back during time interval $b_2$ and the digital audio signal in the 2-track segment is played back during time interval $c_2$. As before, the reproduced video signal is decoded by decoder 12v, which exhibits an inherent time delay $t_2$ on the order of 15 tracks; and the reproduced audio signal is decoded by decoder 12a having the inherent time delay $t_{21}$ which is on the order of 1 track. To provide synchronism between the decoded digital video and audio signals, the audio signal is delayed by delay circuit 14, which imparts a time delay $t_{23}$ on the order of 22 tracks. Hence, the decoded digital video and digital audio signals are recovered in synchronism during time intervals $b_3$ and $c_3$, respectively. That is, even though the digital audio signal is recorded in a 2-track segment and the digital video signal is recorded in a 10-track segment, the audio signal associated with a frame of video signals is recovered in synchronism therewith.

FIG. 5D illustrates the timing relationship between digital audio signals recorded as a 2-track unit in the after-recording mode and the digital video signals which are recorded as a 10-track unit. The digital audio signals are supplied during a time interval $c_4$ substantially immediately following the recovery of an associated frame of digital video signals. The supplied digital audio signals are encoded and then recorded during a time interval $c_5$. As in the normal recording mode, encoder 2a exhibits an inherent time delay $t_{11}$ on the order of 1 track. Thus, in the after-recording mode, when a unit of audio signals is recorded, it is recorded in a 2-track segment that is delayed from the recording of its associated digital video signal by 38 tracks.

When the digital video signal and its associated after-recorded digital audio signal are reproduced, the digital video signal is reproduced during time interval $b_2$ and the digital audio signal is reproduced during time interval $c_5$. These signals are respectively decoded; with decoder 12v exhibiting the inherent time delay $t_2$ (equal to approximately 15 tracks) and decoder 12a exhibiting the inherent time delay $t_{21}$ (approximately equal to 1 track). Since the digital audio signals are not subjected to additional delays by delay circuits 4 and 14 in the after-recording mode, and since the digital audio signals are supplied in units that are approximately equal to 2-track segments, it is seen that the after-recorded digital audio signal is recovered during time interval $c_6$ which is delayed from time interval $b_3$ during which the digital video signal is recovered by 16 tracks. This delay is equal to 1.6 frames, or approximately 0.05 seconds.

It will be appreciated, therefore, that when digital audio signals are recorded as units exhibiting a duration much less than a video frame interval, the time difference between recovered digital video signals and recovered, after-recorded digital audio signals is minimal. This time difference is sufficiently small as not to be noticeable in a video picture. Hence, lip sync is substantially maintained.

The present invention also is adapted to provide synchronism between the recovered digital video and audio signals if it is the video signal that is after-recorded. Referring to FIGS. 6A–6C, let it be assumed that the digital audio signals are recorded as units in 10-track segments, similar to the digital video signals. As can be seen from FIGS. 6A and 6B, the digital audio signal is reproduced from the 10-track segment during a time interval $d_1$. The played back digital audio signal is decoded by decoder 12a, which exhibits the inherent time delay $t_{21}$, and then is ready for recovery. If delay circuit 14 is bypassed by switch 15 or, alternatively, if the delay imparted by this delay circuit is reduced to zero, the decoded digital audio signal is recovered during time interval $d_2$. However, when the digital video signal is recorded in the after-recording mode and then is reproduced from the record medium, the delay imparted to the decoded digital audio signal by delay circuit 14 is increased so as to match the delay attending the recording and reproduction of the after-recorded digital video signal.

As can be seen from FIG. 6C, the digital video signal is supplied for after-recording substantially immediately after the recovery of the digital audio signal with which the video signal is associated. For example, a new video scene may be dubbed onto the record medium to be associated with previously recorded audio signals. A digital video signal thus is supplied for after-recording during a time interval $e_1$ which is delayed by 10 tracks from the recovery of the digital audio signal. As before, the digital video signal is encoded by encoder 2v, which exhibits an inherent time delay $t_1$ (on the order of 15 tracks) and then is recorded by head 7a (or 7b) during a time interval $e_2$. It is seen, then, that the after-recorded digital video signal is recorded in tracks that are delayed from the digital audio signal by 46 tracks.

When the digital audio and after-recorded digital video signals are reproduced, the digital audio signal once again is played back during time interval $d_1$ and is decoded with a time delay $t_{21}$. Delay circuit 14 now is adjusted by CPU 16 to exhibit an increased time delay which now will be explained.

Forty-six tracks after the beginning of the reproduced digital audio signal, the after-recorded digital video signal is played back. The video signal is reproduced during time interval $e_2$ and is decoded by decoder 12v, which exhibits an inherent time delay $t_2$ on the order of about 15 tracks. Then, the decoded, after-recorded digital video signal is recovered during a time interval $e_3$.

From FIG. 6C, it is appreciated that the after-recorded digital video signal is played back 46 tracks after its associated digital audio signal is reproduced. As a result of the inherent time delay of decoder 12v, the after-recorded digital video signal is recovered 61 tracks after the associated digital audio signal is reproduced. Since decoder 12a exhibits an inherent 1-track delay, in order for the after-recorded digital video signal and the digital audio signal to be recovered in synchronism, that is, with essentially no time difference therebetween, delay circuit 14 need impart a 60-track delay to the decoded digital audio signal. As a result of this delay, the digital audio signal is recovered during time interval $d_3$ which substantially coincides with time interval $e_3$ during which the after-recorded digital video signal is recovered.

The foregoing delay may be mathematically expressed as follows: if T is the cumulative delay in supplying the digital video signal for recording, plus the time for reproducing the after-recorded digital video signal, then $T = t_{21} + d_2 + e_1 + e_2 = 31$ tracks. The inherent delay of encoder 2v is $t_1 = 15$ tracks and the inherent delay of encoder 12v is $t_2 = 15$ tracks. Now, the delay $\Delta$ imparted to the decoded digital audio signal so that time interval $d_3$ coincides with time interval $e_3$ is:

$$\begin{aligned}\Delta &= t_1 + (t_2 - t_{21}) + T \\ &= 15 + 14 + 31 \\ &= 60.\end{aligned}$$

When the digital video signal is recorded in the after-recording mode, CPU 8 supplies the aforementioned ID signal to encoder 2v for recording with the video signal. This recorded ID signal is detected by decoder 12v which, in turn, supplies a suitable indication to CPU 16, whereby the delay imparted by delay circuit 14 is increased under CPU control.

As an alternative, a fixed delay may be selectively connected in cascade with delay circuit 14 and selected by switch 15 when the digital audio signals are reproduced while the digital video tape recording apparatus operates in its after-recording playback mode. In either embodiment, by increasing the delay of the decoded digital audio signal when after-recorded digital video signals are played back, the video and audio signals are recovered in synchronism and lip sync is maintained.

In the foregoing description of the after-recording of digital video signals, it has been assumed that a unit of digital audio signals is recorded in a 10-track segment. It is appreciated that the present invention may record digital audio signals in smaller units, such as in 2-track segments. The relationship between the reproduction of such digital audio signals and the after-recording and reproduction of digital video signals is illustrated in FIGS. 6D and 6E. A 2-track unit of digital audio signals is reproduced during a time interval $f_1$; and after decoding, is provided as an output signal during a time interval $f_2$. As before, the decoder used to decode the digital audio signals is assumed to exhibit an inherent time delay $t_{21}$, which is equal to about 1 track.

Substantially immediately after the digital audio signal is recovered, a digital video signal is supplied for after-recording. As shown in FIG. 6E, this digital video signal is supplied during a time interval $g_1$. Then, the digital video signal is encoded by encoder 2v, exhibiting the inherent time delay $t_1$ (equal to about 15 tracks) and recorded during a time interval $g_2$. A comparison of FIGS. 6D and 6E indicates that a frame of after-recorded digital video signals is recorded in a 10-track segment that is delayed by 30 tracks from the 2-track segment in which the associated digital audio signal is recorded.

During reproduction, the digital audio signals are played back during time interval $f_1$, decoded by decoder 12a and then delayed by delay circuit 14 by an amount sufficient to eliminate a time difference that otherwise would appear between the digital audio signal and the recovered, after-recorded digital video signal. The amount of this time delay now will be described.

As can be seen from FIG. 6E, the after-recorded digital video signals are reproduced during time interval $g_2$ which is delayed by 30 tracks from the reproduced digital audio signal. As before, the video signal is decoded by decoder 12v, which exhibits an inherent time delay $t_2$ (on the order of about 15 tracks) and is recovered as a video output signal during a time interval $g_3$.

It is appreciated that delay circuit 14 imparts a time delay to the decoded digital audio signal sufficient to bring the interval $f_3$, during which the digital audio signal is recovered, into synchronism with time interval $g_3$. That is, the beginning of the recovered digital audio signal is brought into time coincidence with the beginning of the recovered, after-recorded digital video signal. Using the foregoing mathematical analysis, it is seen that $T = t_2 + f_2 + g_1 + g_2 = 23$ tracks. $\Delta = t_1 + (t_2 - t_{21}) + T = 15 + 14 + 23 = 52$ tracks. Thus, delay circuit 14 imparts a delay equivalent to 52 tracks; and as a result thereof, lip sync between the video and audio portions of a video picture is maintained.

While the present invention has been particularly shown and described with reference to preferred embodiments, it will be readily appreciated by those of ordinary skill in the art that various changes and modifications may be made without departing from the spirit and scope of the invention. For example, it has been assumed that the inherent time delays exhibited by the video encoder and decoder are equal to each other and, likewise, the inherent time delays exhibited by the audio encoder and decoder are equal to each other. Such time delays may differ. It also has been assumed that two recording/reproducing heads are used for scanning successive tracks across the record medium, these heads being mounted on a rotary drum and spaced apart by 180°. If desired, a greater number of heads may be mounted on this rotary drum. Furthermore, although CPUs 8 and 16 are illustrated as separate processing devices, it is appreciated that a single microprocessor may be used to carry out the operations of both CPU 8 and CPU 16. Still further, although the digital audio signals are illustrated as being recorded in a smaller upper portion of the record tracks, while the digital video signals are recorded in the major portion of such tracks, the digital audio signals may, alternatively, be recorded in the lower portions of such tracks. Additionally, the digital video signal has been shown as an NTSC signal recorded in a 10-track segment. As an alternative, the digital video signal may be a PAL video signal recorded in a 12-track segment. Still further, although a unit of a digital audio signal has been described as equivalent to a 10-track or 2-track unit, it will be appreciated that units of other sizes may be used for encoding and recording the audio signal, as may be desired.

Therefore, it is intended that the appended claims be interpreted as covering the specific embodiments disclosed herein, those alternatives which have been mentioned above and all equivalents thereto.

What is claimed is:

1. Digital video tape recording apparatus for recording digital video and digital audio signals in separate portions of a record track, comprising:

digital video processing means including video record processing means and video reproduce processing means for processing the digital video signal supplied thereto for recording and for reproduction, respectively, each of said video record processing means and said video reproduce processing means exhibiting an inherent time delay $t_1$;

digital audio processing means including audio recording processing means and audio reproduce processing means for processing the digital audio signal associated with said digital video signal and supplied thereto for recording and reproducing, respectively, each of said audio record processing means and said audio reproduce processing means exhibiting an inherent time delay $t_{11}$, where $t_1 > t_{11}$;

delay means including record delay means and reproduce delay mean for delaying the digital audio signal that is recorded and reproduced, respectively, each of said record delay means and reproduce delay mans exhibiting a delay substantially equal to $(t_1 - t_{11})$ so that during a reproduction operation, the reproduced digital video and digital audio signals are recovered in synchronism;

supplying means operable in an after-recording mode for supplying the digital audio signal to said audio record processing means for recording the same in said after-recording mode substantially immediately after the digital video signal with which the supplied digital audio signal is associated is recovered, the recording of the digital audio signal in said after-recording mode being carried out without re-recording the digital video signal; and record delay adjustment means and reproduce delay adjustment means for adjusting the delay of said record delay means and said reproduce delay means, respectively, to zero during said after-recording mode; each of said record and reproduce delay adjustment means comprising bypass means operable during said after-recording mode to bypass said record delay means and said reproduce delay means, respectively.

2. The apparatus of claim 1 wherein said audio record processing means includes means for recording an ID signal representing said after-recording mode; said audio reproduce processing means includes means for reproducing said ID signal when an after-recorded digital audio signal is reproduced; and the bypass means of said reproduce adjustment means includes a bypass switch responsive to the reproduced ID signal for bypassing said reproduce delay means.

3. The apparatus of claim 1 wherein said record delay means and said reproduce delay means are adjustable delay circuits and said record and reproduce delay adjustment means each comprises means for controlling the adjustable delay of a respective delay circuit.

4. The apparatus of claim 1 wherein said digital video processing means includes means for recording a digital video signal of a video frame interval in $n_1$ tracks, where $n_1$ is an integer larger than 1; and said digital audio processing means includes means for recording a digital audio signal associated with said video frame interval in $n_2$ tracks, where $n_2$ is an integer larger than 1.

5. The apparatus of claim 4 wherein $n_1 = n_2$.

6. The apparatus of claim 4 wherein $n_1 > n_2$.

7. The apparatus of claim 4 wherein the video frame interval is an NTSC frame interval and $n_1 = 10$.

8. The apparatus of claim 4 wherein the video frame interval is a PAL frame interval and $n_1 = 12$.

9. Digital video tape recording apparatus for recording digital video and digital audio signals in separate portions of a record track, comprising:

digital video processing means for processing the digital video signal supplied thereto for recording and for reproduction, said digital video processing means exhibiting an inherent time delay $t_1$;

digital audio processing means for processing the digital audio signal associated with said digital video signal and supplied thereto for recording and for reproduction, said digital audio processing means exhibiting an inherent time delay $t_{11}$, where $t_1 > t_{11}$;

delay means for delaying the digital audio signal that is reproduced by an amount of delay so that during a reproduction operation, the reproduced digital video and digital audio signals are recovered in synchronism;

supplying means operable in an after-recording mode for supplying the digital video signal to said digital video processing means, for recording the same in said after-recording mode substantially immediately after the digital audio signal associated with the supplied digital video signal is reproduced and recovered, the recording of the digital video signal in said after-recording mode being carried out without re-recording the digital audio signal;

delay adjustment means for increasing the amount of delay of said delay mean by an amount sufficient to match a cumulative inherent delay in the supply, processing, after-recording, and reproduction of said digital video signal such that the associated digital audio signal and the digital video signal recorded in said after-recording mode are reproduced in synchronism; and wherein said digital video processing means includes means for recording an ID signal representing said after-recording mode and means for detecting said ID signal when the after-recorded digital video signal is reproduced; and said delay adjustment means comprises means responsive to the detected ID signal to control said delay adjustment means.

10. The apparatus of claim 9 wherein said digital video processing means is operably in said after-recording mode to record digital video signals in tracks delayed from the tracks in which the associated digital audio signal is recorded; and said reproduce adjustment means increases the delay of said reproduce delay means to be substantially equal to the delayed tracks less said inherent time delay $t_{11}$.

11. Digital video tape recording apparatus for recording and reproducing digital video and digital audio signals in separate portions of at least one common record track and operable in an after-recording mode to record a digital audio signal that is associated with a previously recorded digital video signal in separate portions of different record tracks without re-recording the digital video signal, said apparatus comprising:

digital video processing means for processing a digital video signal reproduced from a record track, said digital video processing means exhibiting an inherent time delay $t_2$;

digital audio processing means for processing a digital audio signal reproduced from a record track, said digital audio processing means exhibiting an inherent time delay $t_{21}$ where $t_{21} < t_2$;

delay means for delaying the reproduced digital audio signal by an amount of delay substantially equal to $t_2 - t_{21}$ so that the reproduced digital video and digital audio signals are recovered in synchronism; and delay adjustment means operable during the reproduction of the digital audio signal that had been recorded in said after-recording mode to adjust the amount of delay of said delay means to a minimal amount, said delay adjustment means comprising bypass means for bypassing said delay means when the digital audio signal that had been recorded in said after-recording mode is reproduced from a track which differs from the track from which the associated digital video signal is reproduced.

12. The apparatus of claim 11 wherein said delay adjustment means comprises control means for reducing the amount of delay of said delay means when an after-recorded digital audio signal is reproduced from a track which differs from the track from which an associated digital video signal is reproduced.

13. The apparatus of claim 12 wherein the after-recorded digital audio signal includes an ID signal representing the after-recording mode; said digital audio processing means includes means for detecting said ID signal; and said control means is responsive to the detected ID signal to reduce the amount of delay of said delay means.

14. The apparatus of claim 11 wherein the after-recorded digital audio signal includes an ID signal representing the after-recording mode; said digital audio processing means includes means for detecting said Id signal; and said bypass means includes a bypass switch responsive to the detected ID signal for bypassing said delay means.

15. The apparatus of claim 11 wherein a frame interval of said digital video signal is recorded in $n_1$ tracks, where $n_1$ is an integer larger than 1, and the digital audio signal associated with said frame interval of digital video signal is recorded, whether or not in the after-recording mode, in $n_2$ tracks, where $n_2$ is an integer larger than 1.

16. The apparatus of claim 15, wherein $n_1 > n_2$.

17. Digital video tape recording apparatus for recording and reproducing digital video and digital audio signals in separate portions of at least one common record track and operable in an after-recording mode to record a digital video signal that is associated with a previously recorded digital audio signal in record tracks that differ from the record tracks in which said associated digital audio signal is recorded without re-recording the digital audio signal, said apparatus comprising:

digital video processing means for processing a digital video signal reproduced from a record track, said digital video processing means exhibiting an inherent time delay $t_2$;

digital audio processing means for processing a digital audio signal reproduced from a record track, said digital audio processing means exhibiting an inherent time delay $t_{21}$, where $t_{21} < t_2$;

variable delay means for delaying the reproduced digital audio signal by an amount of delay substantially equal to $t_2 - t_{21}$ so that when the digital video and digital audio signals are recorded concurrently, said digital video and digital audio signals are reproduced and recovered in synchronism; and delay adjustment means operable when said digital video signals had been after-recorded to increase the amount of delay of said delay means; and wherein the digital video signal is supplied for recording in said after-recording mode substantially immediately after the associated digital audio signal is reproduced, and is recorded after a time delay $t_1$; and wherein said delay adjustment means is operable to increase the amount of delay of said delay means until it reaches $t_1+(t_2-t_{21})+T$, where T is the cumulative delay in supplying the digital video signal for recording in said after-recording mode and in reproducing the digital video signal recorded in said after-recording mode.

18. The apparatus of claim 17 wherein a frame interval of said digital video signal, whether or not recorded in the after-recording mode, is recorded in $n_1$ tracks and the digital audio signal associated therewith is recorded in $n_2$ tracks.

19. The apparatus of claim 18 wherein $n_1=n_2$.

20. The apparatus of claim 18 wherein $n_1>n_2$.

21. The apparatus of claim 18 wherein $n_1$ is delayed from $n_2$ when the digital video signal is recorded in the after-recording mode.

22. Digital video tape recording apparatus for recording and reproducing digital video and digital audio signals in separate portions of at least one common record track and operable in an after-recording mode to record a digital video signal that is associated with a previously recorded digital audio signal in record tracks that differ rom the record tracks in which said associated digital audio signal is recorded without re-recording the digital audio signal, said apparatus comprising:

digital video processing means for processing a digital video signal reproduced from a record track, said digital video processing means exhibiting an inherent time delay $t_2$;

digital audio processing means for processing a digital audio signal reproduced from a record track, said digital audio processing means exhibiting an inherent time delay $t_{21}$, where $t_{21}<t_2$;

variable delay means for delaying the reproduced digital audio signal by an amount of delay substantially equal to $t_2-t_{21}$ so that when the digital video and digital audio signals are recorded concurrently, said digital video and digital audio signals are reproduced and recovered in synchronism; and delay adjustment means operable when said digital video signals had been after-recorded to increase the amount of delay of said delay means; and wherein the digital video signal recorded in said after-recording mode includes an ID signal representing the after-recording mode, said digital video processing means includes means for detecting said ID signal; and said delay adjustment means includes means responsive to the detected ID signal to increase the amount of delay of said delay means.

* * * * *